(12) United States Patent
Williams

(10) Patent No.: US 7,487,976 B1
(45) Date of Patent: Feb. 10, 2009

(54) HAND TRUCK

(76) Inventor: Mychael J. Williams, 119 Futurity Way, Meridianville, AL (US) 35759

( * ) Notice: Subject to any disclaimer, the term of this patent is extended or adjusted under 35 U.S.C. 154(b) by 109 days.

(21) Appl. No.: 11/453,069

(22) Filed: Jun. 15, 2006

(51) Int. Cl.
*B62B 1/04* (2006.01)
(52) U.S. Cl. .............. 280/47.27; 280/47.23; 280/47.21
(58) Field of Classification Search ................. 280/43, 280/43.1, 43.11, 43.13, 47.21, 47.27, 47.22, 280/11.223
See application file for complete search history.

(56) References Cited

U.S. PATENT DOCUMENTS

| | | | | |
|---|---|---|---|---|
| 1,192,790 | A * | 7/1916 | Knapp | 280/47.12 |
| 1,201,957 | A | 10/1916 | Hall | |
| 1,341,171 | A | 5/1920 | Hall | |
| 1,609,612 | A * | 12/1926 | Eskeland | 280/11.223 |
| 3,462,171 | A * | 8/1969 | Mitty et al. | 280/47.26 |
| 3,963,252 | A * | 6/1976 | Carlson | 280/11.223 |
| 4,248,034 | A * | 2/1981 | Jackson et al. | 56/17.2 |
| 4,457,526 | A | 7/1984 | Persson | |
| 4,762,333 | A * | 8/1988 | Mortenson | 280/43.1 |
| 4,991,698 | A * | 2/1991 | Hanson | 188/380 |
| 5,042,827 | A * | 8/1991 | Mortenson | 280/5.22 |
| 5,071,196 | A | 12/1991 | Sbarro | |
| 5,160,153 | A * | 11/1992 | Zan | 280/43.1 |
| 5,249,847 | A | 10/1993 | Lee | |
| 5,393,078 | A * | 2/1995 | Bourdeau | 280/11.225 |
| 5,398,949 | A * | 3/1995 | Tarng | 280/11.206 |
| 5,464,234 | A * | 11/1995 | Ferguson | 280/5.32 |
| 5,536,025 | A * | 7/1996 | Landay | 280/11.225 |
| 5,951,027 | A * | 9/1999 | Oyen et al. | 280/11.225 |
| 6,012,727 | A * | 1/2000 | Chang | 280/11.28 |
| 6,217,038 | B1 * | 4/2001 | Moe | 280/11.207 |
| 6,273,438 | B1 * | 8/2001 | Prapavat | 280/47.21 |
| 6,416,063 | B1 * | 7/2002 | Stillinger et al. | 280/11.223 |
| 6,874,795 | B2 * | 4/2005 | Sung | 280/11.223 |
| 7,168,712 | B2 * | 1/2007 | Celli | 280/47.18 |

* cited by examiner

*Primary Examiner*—Jeffrey J Restifo
(74) *Attorney, Agent, or Firm*—Dowell & Dowell, PC

(57) ABSTRACT

A hand truck including a body, a load supporting platform, an axle, and a wheel assembly having a pair of wheels. Each wheel has an inner race that is freely rotatable within an outer ground-engaging portion via bearings disposed there between. Each wheel also includes at least one guide member that is mounted to the inner race so that rotation of the guide member rotates the inner race. A slide member is secured to the guide member so that the slide member is movable along the guide member. The axle is attached to the slide member and to the frame so that the body and the guide member are in a fixed parallel relationship. Accordingly, if the body is inclined, the guide member is likewise inclined to serve as a ramp. Due to this structure, a user can easily tip the hand truck, traverse obstacles, and stabilize the hand truck.

20 Claims, 4 Drawing Sheets

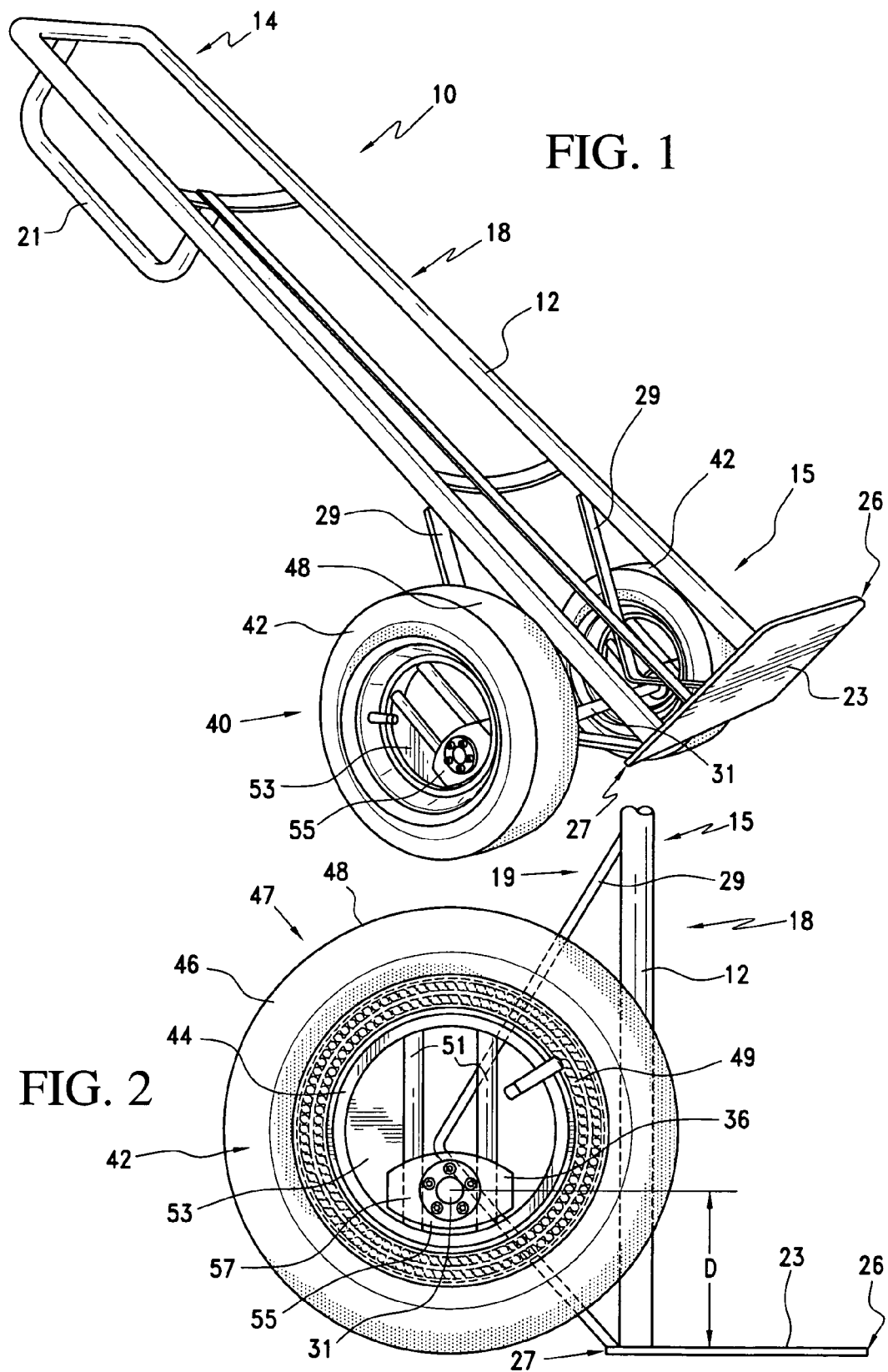

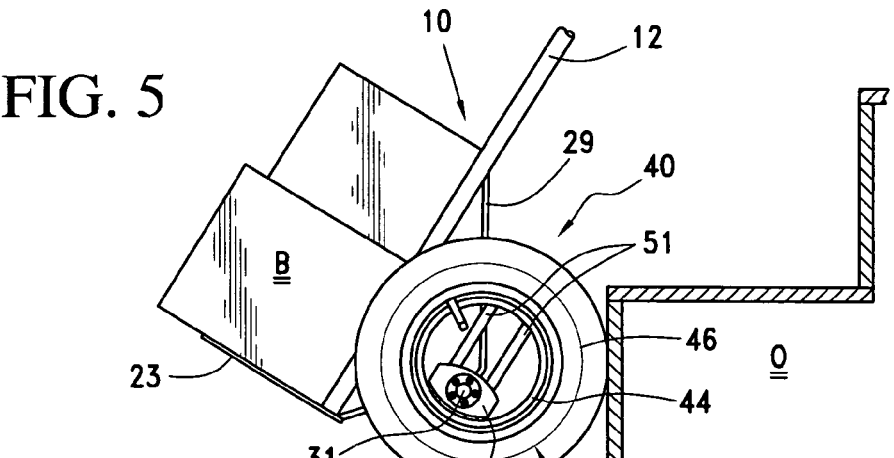
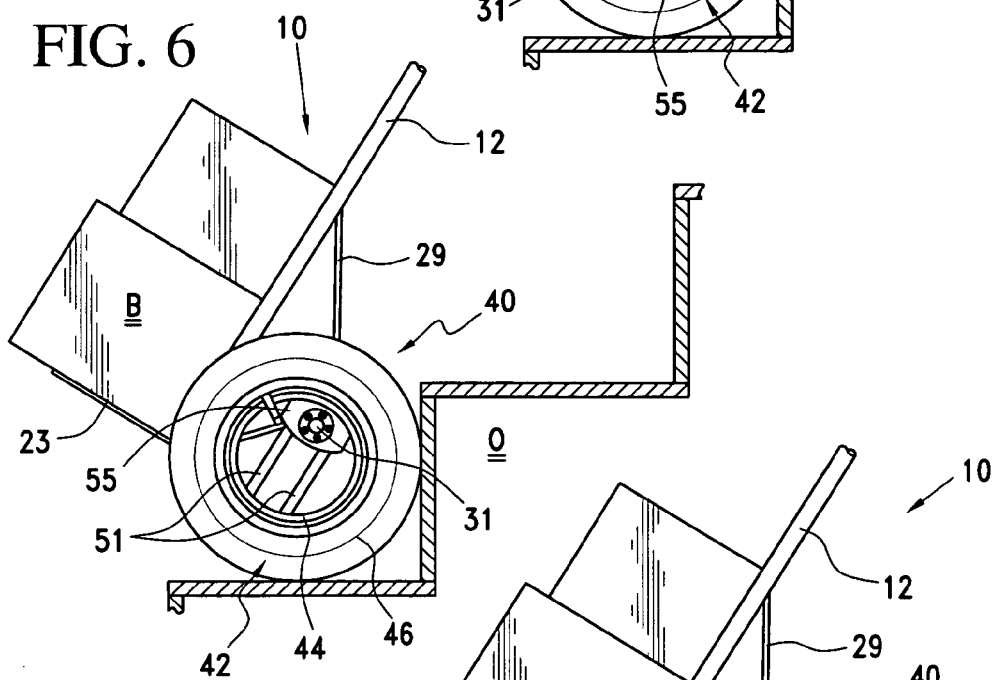
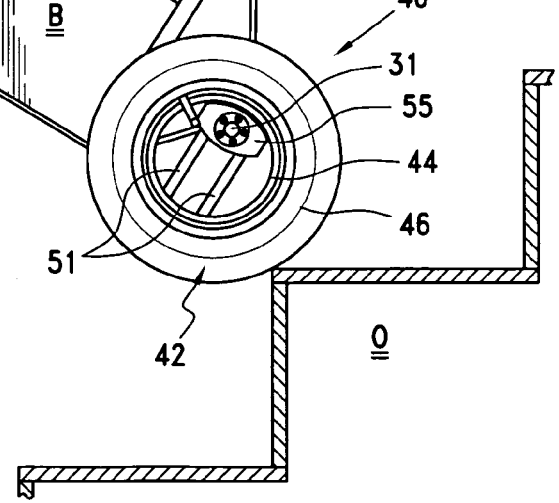

HAND TRUCK

BACKGROUND OF THE INVENTION

1. Field of the Invention

This invention generally relates to hand trucks or dollies and the wheels thereof. More specifically, this invention is directed to a hand truck that is constructed to provide several unique mechanical advantages over conventional hand trucks or dollies, namely less physical effort to tilt the hand truck from a vertical orientation to an inclined orientation to maneuver a load supported thereon and also less physical effort to move the hand truck over obstacles, such as curbs, stairs, bumps, and potholes.

2. Description of Related Art

A hand truck, commonly referred to as a dolly, is used to transport heavy boxes, articles, or other loads. A conventional hand truck typically includes an elongated, tubular body or frame having a handle mounted or formed at an upper end thereof and a load support platform that extends perpendicularly from a lower end thereof. A pair of wheels connected by an axle are usually mounted behind the load support platform at the lower end of the body or frame.

In the use of a conventional hand truck, a user places the hand truck in a rest position, in which the body is substantially vertically oriented so as to be perpendicular to a ground or floor surface. In this position, the user places one or more boxes or other load on the load support platform. To maneuver the load, the user tips the hand truck into an inclined position by tilting the body or frame backwardly relative to the load on the platform to thereby elevate the load such that the body and the load are supported on the wheels. In this position, the load support platform is no longer on the ground and the weight of the load is supported by the body or frame and the wheels. As a result, the user is able to pull or push the load to a desired location.

While a conventional hand truck does aid in the transportation of heavy loads, it does have certain drawbacks. For instance, in order to maneuver a load, the user must tip the hand truck from the rest position where the weight of the load is supported by the load support platform to the inclined orientation where the weight of the load is supported by the body or frame and the wheels. However, the heavier or more bulky the load, the more difficult it is to tilt the hand truck. Further, during the tilting procedure, the user must brace the hand truck at the lower portion thereof to prevent premature horizontal movement of the hand truck.

During tilting, the user must also ensure that the load supported on the support platform is stabilized and tilts backwardly on the body or frame and does not tilt forwardly or laterally relative to the hand truck and thereby fall from a properly seated position on the hand truck. Whenever a center of mass of a load is or becomes spaced beyond a forward or side edge of the support platform, the load will always be tilted away from the body or frame of the hand truck when the hand truck is being tilted to the inclined maneuvering orientation. Therefore, the user must provide sufficient force to retain the load against the body or frame during tilting while again, preventing any premature horizontal motion of the hand truck. Not only can the user be injured trying to physically control a load placed on the support platform, but if the load falls, then it is possible to damage the load being maneuvered. This problem becomes greater when several items are stacked on the support platform for concurrent movement and when large or heavy objects are being handled.

Also, while a conventional hand truck can be very helpful when moving heavy loads across generally planar surfaces, the conventional hand truck cannot easily traverse obstacles, such as stairs and curbs. To maneuver the hand truck over such obstacles, a user essentially has to lift the weight of the load and the hand truck to a position where the axle of the wheels is above the obstacle so that wheels can roll over the obstacle. In other words, with the exception of a rolling contact of the wheels of a conventional hand truck with the risers of stairs and the like, the conventional hand truck does not provide any mechanical assistance when moving a load over an obstacle, such as a stair or curb.

In addition, a conventional hand truck is prone to tipping when it encounters an irregularity in a ground surface, such as a bump or a pothole, often resulting in spilling the item or items being transported. When one wheel of the conventional hand truck encounters the surface irregularity, the body and the load supporting platform, which is perpendicularly mounted thereto, become laterally angled or tilted. As a result, the skewed load support platform causes the load to slide off of the hand truck.

Thus, there remains a need for a hand truck that can be more easily and safely tilted from a rest position to an inclined maneuvering orientation. There also exists a need for a hand truck that can easily traverse obstacles, such as stairs and curbs. Lastly, there is a need for a hand truck that remains stable when it encounters an irregularity in a ground surface, such as a bump or a pothole.

SUMMARY OF THE INVENTION

The present invention is directed to a hand truck that includes an elongated body or frame that has a handle mounted or defined at an upper portion thereof and a load support platform mounted at a lower portion thereof. A wheel assembly is secured to the lower portion of the body or frame and, which, in the preferred embodiment shown and described, includes an axle and a pair of wheels. The axle is connected to the body so that the body is in a fixed position relative to the axle.

Each of the wheels has an annular inner race that is surrounded by an outer race of an annular ground-engaging portion. The ground engaging portion is freely rotatable about the inner race via bearings disposed there between. Each wheel also has at least one guide member that is fixedly connected to opposite sides of the inner race. In the preferred embodiment, the at least one guide member includes a pair of spaced and parallel guide members in a form of two rods or bars. Consequently, rotation of the guide members causes the free rotation of the inner race via the bearings relative to the outer ground engaging portion of the wheel and visa versa.

Each of the wheels also includes a slide member that is slidably mounted to and between the guide members. The axle is fixedly mounted to the slide member so that rotation of the axle likewise rotates the slide member and thus the inner race. Also, the axle is positioned so that it moves with the slide member between the guide members. The axle is secured to the guide members so that the guide members are retained parallel to the elongated body of the hand truck. Therefore, as the axle is fixedly connected to the elongated body, the guide members are always in a generally parallel relationship with the elongated body. In this manner, the guide members can function as mechanically advantageous ramps when the body or frame of the hand truck is in an inclined maneuvering position.

Accordingly, it is a primary object of the invention to provide a hand truck or dolly that is easier and safer to use than conventional hand trucks. Specifically, it is an object of the invention to provide a hand truck that may be placed into an inclined transporting position or orientation with less manual force and with less chance of accidental load displacement than compared to conventional hand trucks. As the axle and the elongated body or frame of the hand truck are secured to the slide member, they are movable relative to the guiding members of each of the wheels so that the distance between the axle and a central axis of each wheel is variable. Thus, when the hand truck is in a rest or loading position where the body extends generally vertically and the support platform extends horizontally along a surface, such as a floor or the ground, the slide member, and subsequently the axle, will be positioned close to the surface and proximate to a lowermost portion of the inner race. In this position, the amount of force it takes to tilt the hand truck and the load is minimized because the distance between a pivot axis, namely a lowermost portion of the bearings, and the load on the load support platform is reduced. Moreover, the hand truck is easily tilted because the body and the axle easily pivot with the inner race along the bearings, without placing any direct force on the ground engaging portions of the wheels.

It is a further object of the invention to provide a hand truck that requires less force to raise the hand truck and any load supported thereon over obstacles, such as stairs or curbs, compared to conventional hand trucks. Due to the relationship of the guide members to the elongated body, the guide members serve as mechanically advantageous ramps to reduce the amount of force needed to traverse obstacles. When the hand truck of the present invention encounters an obstacle, such as a stair riser or curb, the guide members will be automatically positioned at an incline relative to the obstacle when the outer ground engaging portions of the wheels engage the obstacle. The user then merely pulls on the hand truck, and slide member, the axle, the body or frame, and the load on the support platform slide upwardly along the inclined surfaces of the guide members. When the slide member engages the opposite wall of the inner race, the axis of rotation, namely the axle, of the wheels is very close to the level or height of the obstacle. Thus, minimum vertical lifting force is necessary, as compared to conventional hand trucks.

Another object of the present invention is to provide a hand truck with an adjustable axis of rotation so that the hand truck will remain relative stabile, even when one of the wheels encounters a pothole or similar surface irregularity. Generally, in the inclined maneuvering position, the elongated body or frame of the hand truck, and thus the sliding member and the axle, is positioned proximate to the lowermost position of the inner race. Accordingly, when a wheel encounters a surface depression, the slide member, the axle, and thus the wheel will automatically move upwardly along the guide members to thereby stabilize the hand truck.

It is a further object of the invention to provide a wheel assembly that may be mounted to existing hand trucks or dollies to make the hand trucks or dollies easier and safer to use. The wheel assembly includes a pair of wheels, wherein each wheel has at least one guide member that is fixed in a generally parallel relationship to the main body or frame of the existing hand truck by way of a slide member that is movably mounted to the at least one guide member. The main body or frame, slide member, and at least one guide member are rotatably mounted within a ground engaging portion of the wheels such that the at least one guide member is aligned to function as a ramp along which the slide member, axle, and the main body of the hand truck are movable. As a result, the wheel assembly allows the hand truck or dolly to be placed in an inclined transporting position with less force and less chance of load spillage than conventional hand trucks. The wheel assembly also allows the hand truck or dolly to traverse obstacles, such as stairs and curbs, with less vertical lifting force than conventional hand trucks by the mechanical advantage provided by the ramped surface of the at least one guide member. Lastly, the wheel assembly allows the hand truck or dolly to remain stable when encountering a surface irregularity, such as a pothole.

BRIEF DESCRIPTION OF THE DRAWINGS

A better understanding of the invention will be had with reference to the accompanying drawings.

FIG. 1 is a front perspective view of the hand truck of the present invention in an inclined transporting orientation.

FIG. 2 is a partial side view of the hand truck of the present invention showing a wheel.

FIG. 5 is a side illustrational view of the hand truck as the wheels encounter an obstacle, such as a stair riser.

FIG. 6 is an illustrational view similar to FIG. 5, showing the relative position of the wheel assembly to the main body and the axle of the hand truck as the main body and the axle slide up along guide members of the wheel that function as ramps.

FIG. 7 is an illustrational view similar to FIGS. 5 and 6, showing the hand truck substantially raised to the upper tread of the stairs.

DETAILED DESCRIPTION OF THE PREFERRED EMBODIMENT

Figure 3:
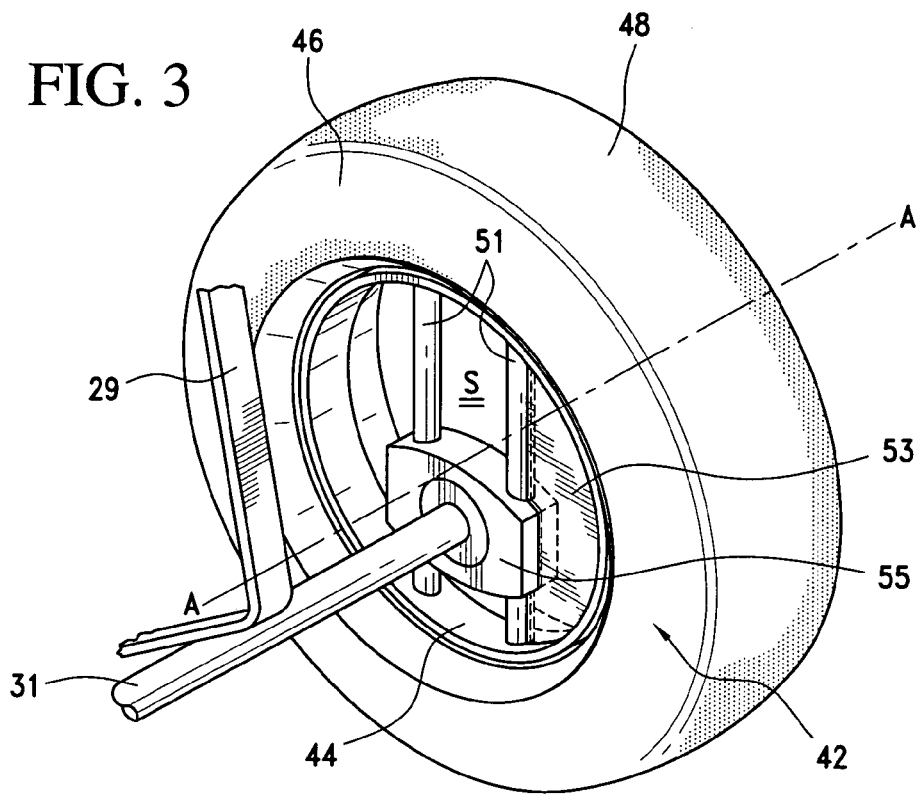
FIG. 3 is a rear perspective view a wheel showing a slide member and an axle in a lowered position.

As shown in FIG. 1, a hand truck 10 includes an elongated main body or frame 12 having an upper end 14, a lower end 15, a front surface 18, and a rear surface 19. Although the hand truck shown is a utility type of hand truck, the teachings of the invention may be used with other types or styles of hand trucks or dollies, including appliance dollies. A handle 21 is mounted on the upper end 14 of the elongated body 12. In some embodiments, the handle 21 may be formed by the upper portion 14 of the body 12 so that handle 21 is integral with the body 12.

At the lower end 15 of the elongated body 12, a load support platform 23 is provided and extends perpendicularly from the front surface 18 of the body 12. The load support platform 23 includes a front surface 26 and a rear surface 27. Although the platform 23 is shown as being fixedly secured to the main body 12, in some embodiments, the platform 23 may be pivotally mounted to the body 12 so that the platform 23, when not in use, may be pivoted into a compact and parallel relationship with the body 12.

A pair of L-shaped axle support members 29 are secured to the rear surface 19 of the lower end 15 of the elongated body 12. The L-shaped members 29 extend from the rear surface 19 of the lower end 15 of the elongated body 12 to the rear surface 27 of the load support platform 23, as shown in FIG.

2. The L-shaped members 29 may be secured to the body 12 and the platform 23 by any suitable means, such as welds, pins, fasteners, and screws.

Figure 4:
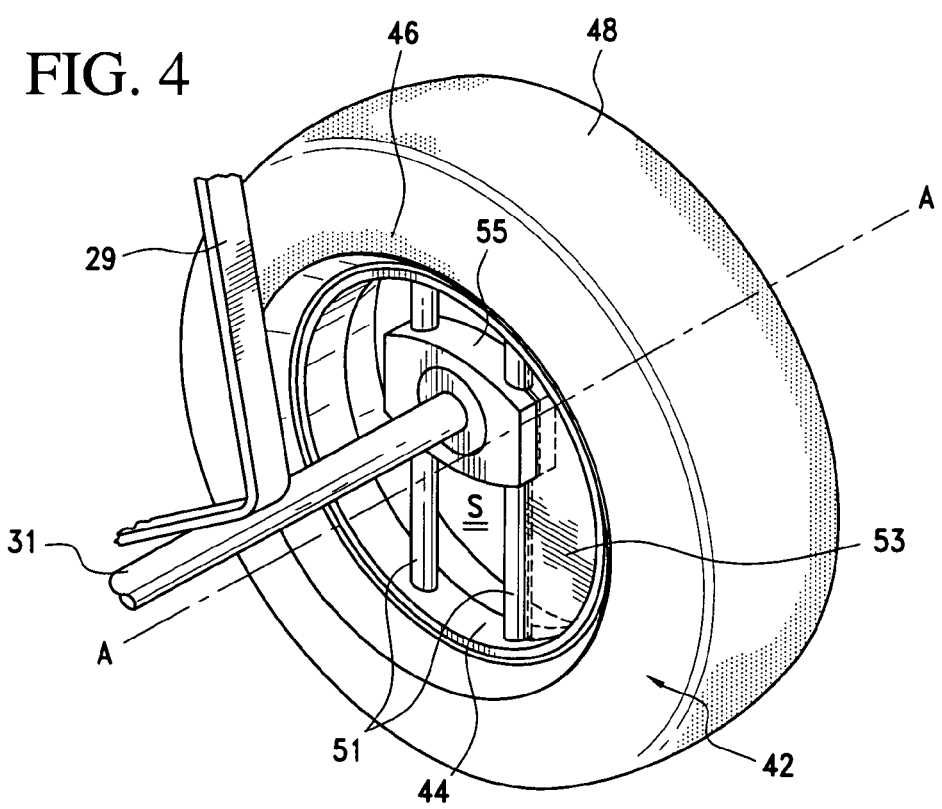
FIG. 4 is a view similar to FIG. 3, showing the slide member and the axle in a raised position.

An axle 31 is welded or otherwise secured to the L-shaped axle support members 29. In a preferred embodiment, the axle 31 includes a single shaft. Although a single axle is shown in the drawings, the axle may be formed by two spaced stub shafts. Therefore, the term "axle" as described and claimed in this application includes both a single member or a pair of members or shafts. As the axle 31 is welded or otherwise fixedly attached to the L-shaped members 29, as shown in FIGS. 3 and 4. As the L-shaped members 29 are welded or otherwise fixedly secured to the main body 12, the axle 31 will be movable with the main body or frame 12, as will be described in greater detail hereinafter.

A wheel assembly 40, including a pair of wheels 42, is located at the lower end 15 of the body or frame 12. Each of the wheels 42 is mounted adjacently to opposing ends of the axle 31. As shown in FIG. 2, each of the wheels 42 has an annular inner race or hub 44 that is surrounded by an outer ground-engaging annular race 46. An outer surface 47 of the ground-engaging race includes a tread portion 48 that may be a solid rubber-like material, an inflatable tire material, or any other suitable material. The inner race 44 and the outer ground-engaging race 46 are freely rotatable abut each other via bearings 49 positioned intermediate the inner and outer races 44 and 46, respectively.

In addition, each wheel 42 is provided with a least one guide member 51 that extends across the inner race or hub 44. In the preferred embodiment shown, the at least one guide member 51 includes a pair of spaced, parallel rods that extend between opposite sides of the inner race or hub 44 and are anchored thereto. The two rods are equally spaced on opposite sides of a central axis A of the inner race or hub 44. In some embodiments, the at least one guide member 51 may be spaced through the central axis A or spaced at various distances with respect thereto. Since the guide members 51 are fixed to the inner race or hub 44, any rotation of the guide members 51 causes free rotation of the inner race 44 relative to the outer ground-engaging race 46 via the bearings 49. Further, in the preferred embodiment, each wheel 42 also has at least one reinforcing means 53 for additional support. In the preferred embodiment, the reinforcing means 53 include a reinforcing flange secured between a guide member 51 and the inner race 44 to provide additional support.

A slide member 55 is mounted to the at least one guide member 51 so that the guide member 51 serves as a guide for the slide member 55. The slide member 55 of the preferred embodiment includes a pair of open channels 57 there through. The guide members 51 extend through the channels 57 to thereby slidably mount the slide member 55 to and between the guide members 51 in such a manner that the slide member 55 is freely movable across the inner space S of the inner race or hub 44, as illustrated in FIGS. 3 and 4.

Each of the opposing ends of the axle 31 are fixedly secured to the slide member 55 of each wheel 42. Since the axle 31 is fixedly secured or mounted to the slide member 55, any rotation of the axle 31 likewise rotates the slide member 55, which rotates the guide members 51, which then rotates the inner race 44 relative to the outer ground-engaging race 46 via the bearings 49. Also, the axle 31 is positioned so that it moves with the slide member 55 between the guide members 51 between a lowered position shown in FIG. 3 and a raised position shown in FIG. 4.

When the axle 31 is mounted to the slide member 55, the inner race 44 is rotated relative to the outer race 46 until the guide members 51 are in a parallel relationship with the elongated body 12. Thereafter, the parallel relationship is retained by locking the slide member 55 to the axle 31 via securing means 58, such as compression screws. Consequently, as the body or frame 12 is tilted, the slide member 55 and the guide members 51 rotate the inner race 44 about the outer race 46 via the bearings 49 so as to always maintain a parallel relationship between the guide members 51 and the body or frame 12.

To use the hand truck 10, a user places the hand truck 10 in a rest position, in which the elongated body section 12 is substantially perpendicular to a ground surface so that the load support platform 23 rests on the surface, as shown in FIG. 2. In this position, the user places a load, such as several boxes B, as shown in FIGS. 5-7, onto the load support platform 23. After the load is placed on the load support platform 23, the user tips the hand truck 10 into an angled orientation wherein the load is supported both by the support platform 23 and the main body or frame 12 for transportation.

One of the benefits of the invention is that the amount of force required to tip the hand truck 10 from the rest position shown in FIG. 2 to the inclined orientation illustrated in at least FIG. 1 is minimized. As shown in FIG. 2, when the hand truck 10 is at rest, the slide member 55 and thus the axle 31 are positioned at a lowest position relative to the inner race 44 so that a distance D between the axle 31 and the support platform 23 is at a minimum. Since the axle 31 is immediately adjacent to a pivot point, namely the bearings 49, only a minimal amount of force is needed to be applied to the handle 21 or to the upper portion 14 of the body or frame 12 to cause the body or frame 12 and the load supported thereon to rotate with the inner race 44 relative to the outer ground engaging race 46 of the wheel assembly 40. Further, there is no need to apply a blocking force to the axle 31 during pivoting or tilting of the main body 12, as is often necessary to prevent premature movement of the wheels of a conventional hand truck. Due to the bearings 49 between the inner race 44 and outer race 46 of each of the wheels 42, the combined weight of the load and the main body 12 of the hand truck 10 is easily pivoted with the inner race 44. Thus, less force or effort is required, and the user can pay more attention to stabilizing the load to ensure that the load remains properly engaged with the body 12 during tilting.

Not only is the tilting of the hand truck 10 easier, the fixed parallel relationship between the guide members 51 and the main body 12 allows the guide members 51 to function as ramps whenever the hand truck 10 is tilted to traverse an obstacle O, such as a stair or a curb, as illustrated in FIGS. 5-7. When the wheel assembly 40 of the hand truck 10 first encounters the obstacle O, that is, before a user applies any upward force to lift the hand truck 10 over the obstacle O, the weight of the hand truck 10 and the load supported thereon causes the slide member 55 and thus the axle 31 to be positioned at the lowest position relative to the inner race 44, as shown in FIG. 5. Since the elongated body 12 and the guide members 51 are in a fixed, parallel relationship, as the user tilts the elongated body 12 to pull the hand truck 10 over the obstacle O, the inner race 44 rotates relative to the outer ground-engaging portion 46 via the bearings 49 so that the guide members 51 are likewise in a titled or inclined orientation.

When the guiding members 51 are tilted, they are oriented so that they can act as inclined planes or ramps and thereby provide a mechanical advantage to the user, as shown in FIGS. 5-7. As the user pulls on the hand truck 10 and applies a force that is parallel to body 12 and the guide members 51, slide member 55, and thus the axle 31, body 12 and load support platform 26, slide upwardly along the inclined surfaces of the guide members 51 until the slide member 55 engages an upper portion of the inner race 44, as shown in FIG. 6. In this position, the axle 31 and the load supported on the load support platform 23 are substantially at the level of the height of the obstacle O so that the hand truck 10 can roll over the obstacle O, as shown in FIG. 7.

Figure 8:
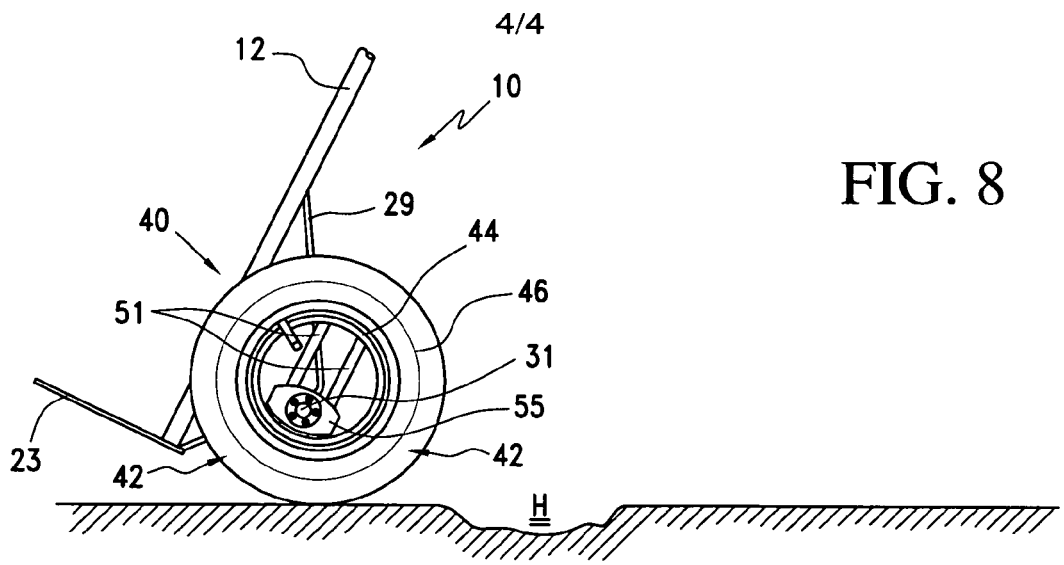
FIG. 8 is a side illustrational view of the hand truck oriented in its inclined transporting orientation as it is about to encounter an irregularity in a ground surface.
Figure 9:
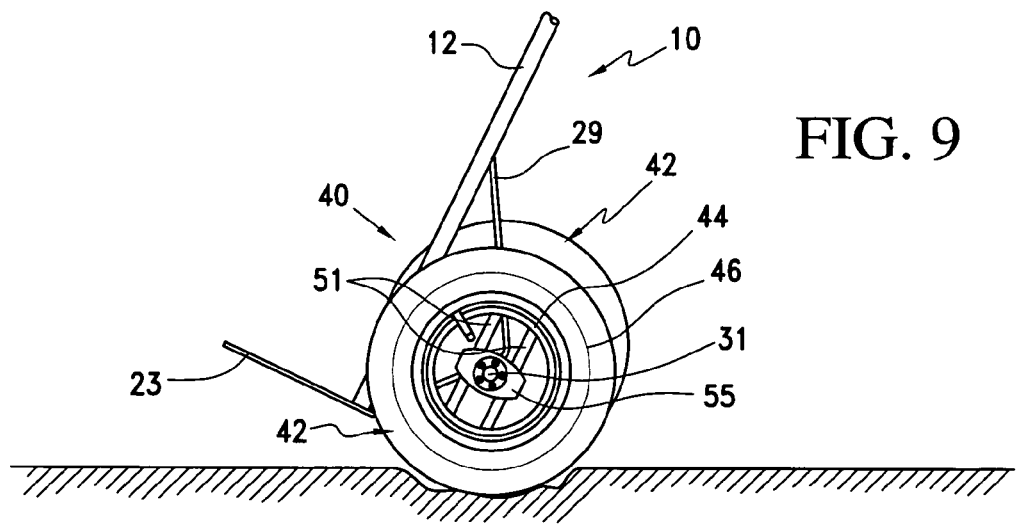
FIG. 9 is a side illustrational view similar to FIG. 8, showing the relative position of the wheel to the main body and the axle as the hand truck encounters the irregularity in the ground surface.

Also, when the hand truck 10 encounters an irregularity in a ground surface, such as a pothole, the hand truck 10 will remain stable so that the load will not shift and fall off of the load support platform 23. As previously described, as a user maneuvers the hand truck 10, the axle 31 and the slide member 55 are normally located against the lowermost surface of the inner race 44 due to the weight of the load and the hand truck 10, as shown in FIG. 8. When one wheel 42 of the hand truck 10 encounters a hole H, the slide member 55 is able to move upwardly along the guide members 51 to change the position of the wheel 42, as shown in FIG. 9.

Figure 10:
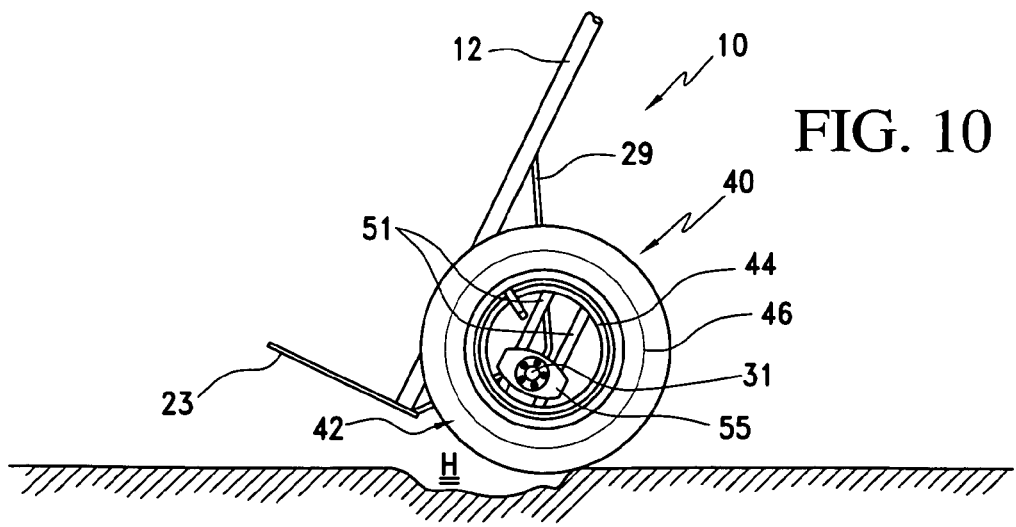
FIG. 10 is a side illustrational view similar to FIGS. 8 and 9, showing the hand truck as it overcomes the irregularity in the ground surface.

Similarly, after the hand truck 10 passes the irregularity, the slide member 55 slides downwardly along the guide members 51 back to its original position, as shown in FIG. 10. While the irregularity causes the position of the wheel 42 to change, the position of the axle 31 remains the same. Thus, the load support platform 23 does not tilt and a load supported thereon will not spill.

An existing hand truck or dolly can also be retrofitted so as to embody the structure of the present invention and achieve all of the benefits associated therewith.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

I claim:

1. A hand truck comprising:
   a body;
   a load support platform extending from a lower end of the body;
   an axle secured in fixed relationship to the body;
   a pair of wheels located at the lower end of the body, each including:
      an inner annular race;
      an outer annular ground engaging portion that surrounds the inner race;
      bearings disposed between the inner and outer races so that the inner and outer races are rotatable relative to each other;
      at least one guide member fixedly mounted within an inner area defined by the inner race and fixedly mounted within, and secured at opposite ends thereof to, the inner race so as to be rotatable therewith;
      a slide member slidably mounted to the at least one guide member so that the slide member is freely movable across the inner race; and
      the axle being mounted to the slide member of each wheel so that the axle is moveable with the slide members across the inner race and between generally opposite sides of the inner race so that the position of the axle is movable relative to a central axis of the wheel and so that the body can pivot with the inner race relative the outer race.

2. The hand truck of claim 1, wherein the axle is a pair of stub shafts.

3. The hand truck of claim 1, wherein each wheel further includes reinforcing means for providing additional support.

4. The hand truck of claim 3, wherein the reinforcing means include a flange located between the at least one guiding member and the inner race.

5. The hand truck of claim 1, wherein the guide member includes two parallel rods that extend between opposite sides of the inner race.

6. The hand truck of claim 5, wherein the parallel rods are equally spaced on opposite sides of a central axis of the inner race.

7. The hand truck of claim 1, wherein the slide member includes at least one channel there through for receiving the at least one guide member.

8. The hand truck of claim 1, wherein the axle is held in position relative to the slide member by securing means.

9. A wheel assembly for a hand truck, comprising:
   at least one axle secured in fixed relationship to a body of the hand truck;
   a pair of wheels, each including:
      an inner annular race;
      an outer annular race having a ground engaging portion that surrounds the inner race;
      bearings disposed between the inner and outer races so that the inner and outer races are rotatable relative to each other;
      at least one guide member extending across an inner area defined by the inner race and fixedly mounted within, and secured at opposite ends thereof to, the inner race so as to be rotatable therewith;
      a slide member slidably mounted to the at least one guide member so that the slide member is freely movable from adjacent one side of the inner race to another side thereof; and
      the axle being mounted to the slide member of each wheel so that the axle is moveable with the slide members between generally opposite sides of the inner race and so that the body can pivot with the inner race relative the outer race and so that the position of the axle is movable relative to a central axis of the wheels.

10. The wheel assembly of claim 9, wherein the axle is a pair of stub shafts.

11. The wheel assembly of claim 9, wherein each wheel further includes reinforcing means for providing additional support.

12. The wheel assembly of claim 9, wherein the guide member includes two parallel rods that extend between opposite sides of the inner race.

13. The wheel assembly of claim 12, wherein the parallel rods are equally spaced on opposite sides of a central axis of the inner race.

14. The wheel assembly of claim 9, wherein the slide member includes at least one channel there through for receiving the at least one guide member.

15. The wheel assembly of claim 9, wherein the axle is held in position relative to the slide member by securing means.

16. A wheel for a hand truck, wherein the hand truck includes an axle secured in fixed relationship to a body, the wheel comprising:
   an inner annular race;
   an outer annular ground engaging portion that surrounds the inner race;
   bearings disposed between the inner and outer races so that the inner and outer races are rotatable relative to each other;
   at least one guide member fixedly mounted within and secured across and inner area defined within the inner race so as to be rotatable therewith;

a slide member freely slidably mounted to the at least one guide member; and securing means for mounting the axle to the slide member so that the axle is moveable with the slide member between opposite sides of the inner race when the axle is mounted thereto and so that the body can pivot with the inner race relative the outer race and so that the position of the axle is movable relative to a central axis of the wheel.

17. The wheel of claim 16, further comprising reinforcing means for providing additional support.

18. The wheel of claim 16, wherein the guide member includes two parallel rods that extend between opposite sides of the inner race.

19. The wheel of claim 18, wherein the parallel rods are equally spaced on opposite sides of a central axis of the inner race.

20. The wheel of claim 16, wherein the slide member includes at least one channel there through for receiving the at least one guide member.

* * * * *